US008287163B2

(12) United States Patent
Watanabe et al.

(10) Patent No.: US 8,287,163 B2
(45) Date of Patent: Oct. 16, 2012

(54) AUTOMOTIVE HEADLAMP APPARATUS AND METHOD OF CONTROLLING AUTOMOTIVE HEADLAMP APPARATUS WHERE LIGHT DISTRIBUTION PATTERN IS CONTROLLED (75) Inventors: Takao Watanabe, Shizuoka (JP); Satoshi Yamamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 806 days.

(21) Appl. No.: 12/361,483

(22) Filed: Jan. 28, 2009

(65) Prior Publication Data

US 2009/0190324 A1 Jul. 30, 2009

(30) Foreign Application Priority Data

Jan. 29, 2008 (JP) ................. 2008-018129

(51) Int. Cl.
*B60Q 1/00* (2006.01)
(52) U.S. Cl. .......... 362/466; 362/507; 362/545
(58) Field of Classification Search .......... 362/464–466, 362/507, 543–545
See application file for complete search history.

(56) References Cited

U.S. PATENT DOCUMENTS

| 6,817,740 B2* | 11/2004 | Kobayashi et al. | ............ 362/466 |
| 7,824,085 B2* | 11/2010 | Watanabe | ..................... 362/466 |
| 2004/0263346 A1 | 12/2004 | Neal | |
| 2007/0041207 A1* | 2/2007 | Ishida | ............ 362/538 |
| 2007/0147055 A1 | 6/2007 | Komatsu | |
| 2007/0183164 A1 | 8/2007 | Naganawa et al. | |
| 2008/0144326 A1* | 6/2008 | Watanabe | ..................... 362/466 |

FOREIGN PATENT DOCUMENTS

| CN | 1609503 A | 4/2005 |
| DE | 103 14 524 A1 | 10/2004 |
| DE | 10 2004 020 493 A1 | 11/2005 |
| DE | 10 2006 061 637 A1 | 7/2007 |
| EP | 2 037 167 A2 | 3/2009 |
| JP | 2005329819 | 12/2005 |
| WO | 2006/016327 A2 | 2/2006 |

OTHER PUBLICATIONS

Translation of filing particulars and abstract for CN1609503A; Published: Apr. 27, 2005; Applicant: Stanley Electric Co., Ltd.
SIPO, Office Action in Chinese Patent Application No. 20091020301.X dated Feb. 2, 2012 with English Translation.

* cited by examiner

*Primary Examiner* — Stephen F Husar
*Assistant Examiner* — Meghan Dunwiddie
(74) *Attorney, Agent, or Firm* — Fulwider Patton LLP (57) ABSTRACT

An automotive headlamp apparatus includes a light source for producing a high beam and a headlamp apparatus controller for controlling illumination from a light source. The headlamp apparatus controller divides a light distribution pattern of a high beam formed by illumination from the light source into a plurality of regions and controls illumination from each of the individual regions as divided so as to supplement a light distribution pattern of a low beam.

15 Claims, 9 Drawing Sheets

AUTOMOTIVE HEADLAMP APPARATUS AND METHOD OF CONTROLLING AUTOMOTIVE HEADLAMP APPARATUS WHERE LIGHT DISTRIBUTION PATTERN IS CONTROLLED

CROSS-REFERENCES TO RELATED APPLICATIONS

This application claims priority from Application No. 2008-018129, filed Jan. 29, 2008.

BACKGROUND OF THE INVENTION

1. Field of the Invention

The present invention relates to an automotive headlamp apparatus used in, for example, vehicles, and a method of controlling an automotive headlamp apparatus.

2. Description of the Related Art

Generally, an automotive headlamp apparatus is capable of switching between a low beam and a high beam. A low beam is for illuminating an area close to, for example, a vehicle with a predefined intensity. Distribution of a low beam is subject to provisions that provide for prevention of glare as experienced by oncoming vehicles or vehicles in front. A low beam is primarily used on city streets. A high beam is for illuminating wide areas ahead and distant areas with a relatively high illumination intensity. A high beam is primarily used for high-speed driving on a road with relatively few oncoming vehicles and vehicles in front. As such, a high beam is superior to a low beam in respect of visibility for the driver. However, a high beam has a disadvantage of causing the driver of a vehicle or pedestrian ahead of the illuminating vehicle to experience a glare.

This is addressed by a known technology for reducing a glare as experienced by vehicles or pedestrians by, for example, reducing illumination in an area corresponding to a vehicle or pedestrian when the vehicle or pedestrian is detected in a high beam distribution pattern while a high beam is being used (JP 2005-329819).

We have come to be aware of the following problem. While a low beam is usually used for night driving in city districts, the light source for a high beam is not used while a low beam is being used. Meanwhile, there is always a need to improve the visibility of a road for the driver while a low beam is being used.

SUMMARY OF THE INVENTION

The present invention addresses the problem and one of the purposes thereof is to provide a technology for improving the visibility of a road for the driver while a low beam is being used.

An automotive headlamp apparatus addressing the problem comprises: a light source for producing a high beam; and a controller for controlling the illumination from the light source, wherein the controller divides a light distribution pattern formed by illumination from the light source into a plurality of regions and controls illumination from each of the individual regions as divided so as to supplement a light distribution pattern of a low beam.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will be given, with reference to the drawings, of preferred embodiments of the present invention. In the figures, like numerals represent like constituting elements, members, and processes and the description thereof is omitted as appropriate. Reference herein to details of the illustrated embodiments is not intended to limit the scope of the claims. It should be understood that not all of the features and the combination thereof discussed are essential to the invention.

First Embodiment

The automotive headlamp apparatus according to the first embodiment controls illumination from a light source for producing a high beam so as to supplement a light distribution pattern for a low beam, even while an instruction to the automotive headlamp apparatus requests a low beam.

Figure 1:
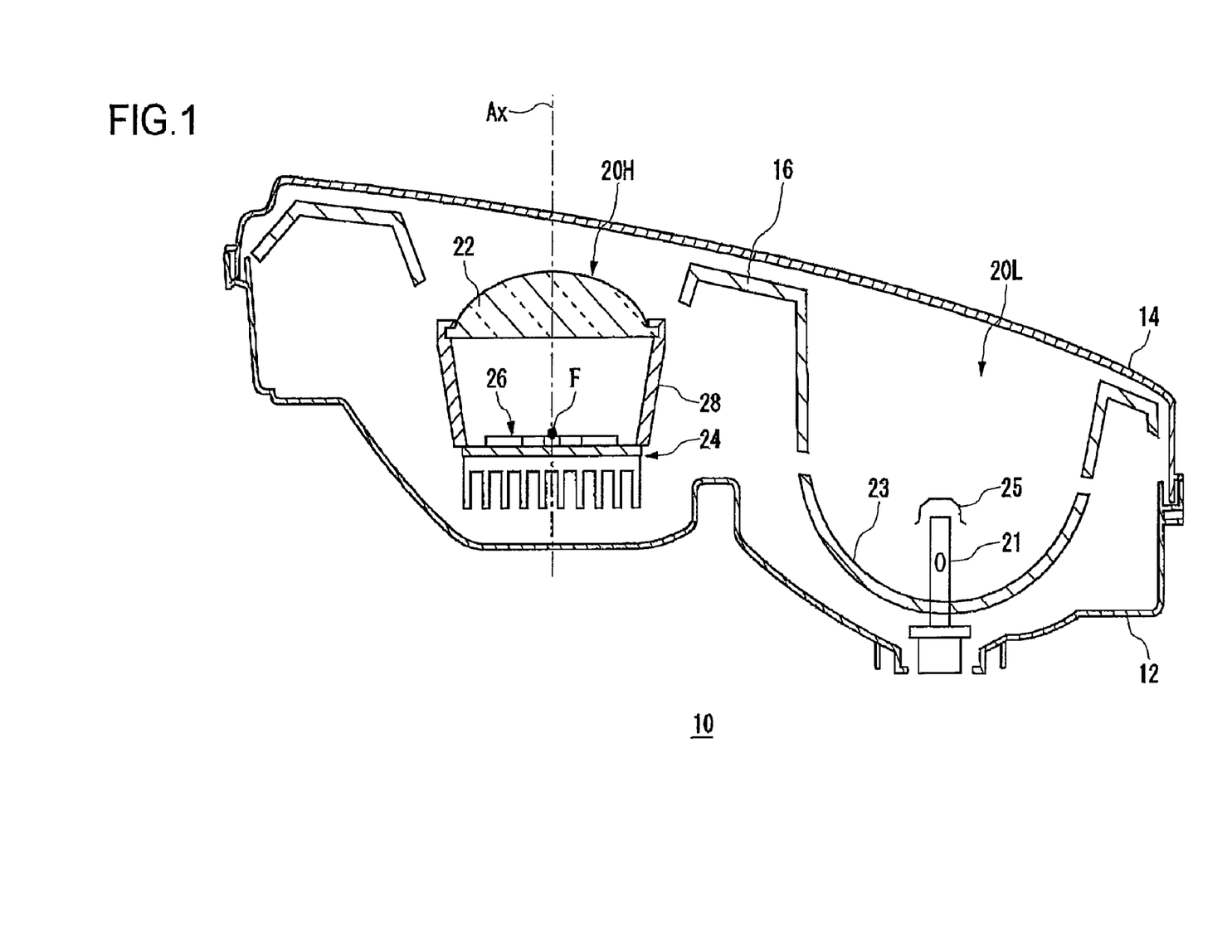
FIG. 1 is a schematic horizontal section of the automotive headlamp apparatus according to the first embodiment.

FIG. 1 is a schematic horizontal section of the automotive headlamp apparatus according to the first embodiment.

The automotive headlamp apparatus 10 according to the first embodiment is configured such that a lamp body 12 and a transparent cover 14 fitted to the front end opening of the lamp body 12 form a lamp chamber. Inside the chamber are accommodated a low beam lamp 20L and a high beam lamp 20H. Hereinafter, the low beam lamp 20L and the high beam lamp 20H will be generically referred to as lamps. The lamps are fitted to the lamp body 12 via respective supporting members (not shown). An extension member 16 having an opening where the lamps are located is secured to the lamp body 12 or the transparent cover 14, covering the area between the front opening of the lamp body 12 and the lamps.

The low beam lamp 20L is a reflector type lamp well known in the art and has a light source bulb 21 and a reflector 23. The low beam lamp 20L is configured to cause light emitted from the light source bulb 21 to be reflected by the reflector 23. A portion of the light directed forward by the reflector 23 is cut by a light shielding plate (not shown) so as to create a light distribution pattern for a low beam having a predefined cut-off line. A shade 25 for cutting the light directly emitted forward by the light bulb 21 is provided at the end of the light bulb 21. The shape of the low beam lamp 20L is not limited to the shape described above. The lamp 20L may be a projector type lamp similar to the high beam lamp 20H described later.

The high beam lamp 20H is a projector type lamp and comprises a projection lens 22, a light source unit 24 provided with a light source 26 for producing a high beam, and a holder 28 for holding the projection lens 22 and the light source unit 24 in their places. The projection lens 22 is embodied by a planoconvex aspheric lens having a convex front surface and a planar back surface. The lens 26 is provided on a light axis Ax extending in the longitudinal direction of the vehicle. The projection lens 22 is configured to project an image on the back focal plane including the back focal point F onto a hypothetical vertical screen set up in front of the lamp as an inverted image. The periphery of the projection lens 22 is held by the annular groove formed at the front end of the holder 28.

The light source unit 24 is held at the back end of the holder 28 behind the back focal point F of the projection lens 22 such that the light source 26 is oriented forward in the direction of light axis Ax. The light source unit 24 is configured to directly emit light from the light source 26 to the projection lens 22. The holder 28 is fitted to the lamp body 12 via a supporting member (not shown).

Figure 2:
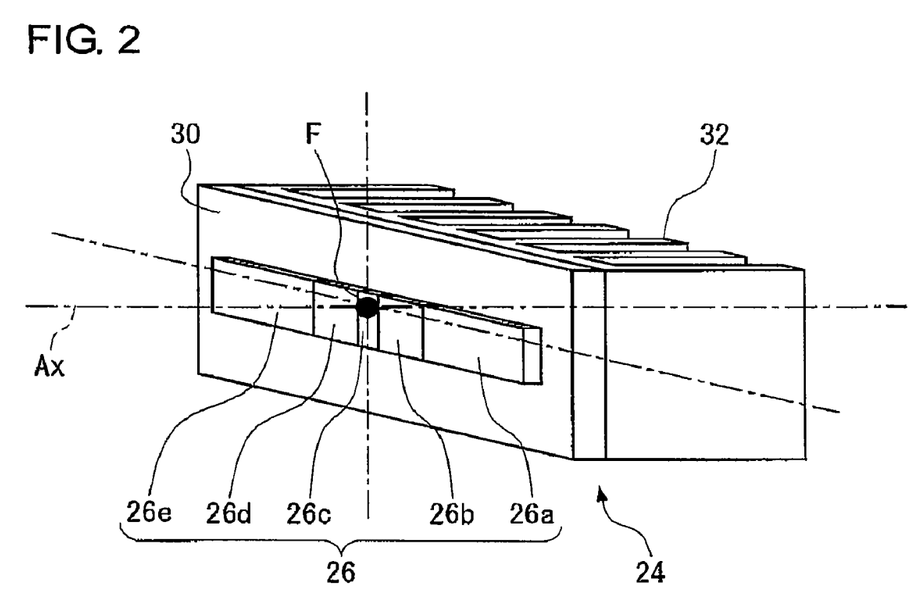
FIG. 2 is a schematic diagram of a light source unit of a high beam lamp.

FIG. 2 is a schematic diagram of the light source unit 24 of the high beam lamp 20H.

The light source unit 24 comprises a light source 26, a supporting plate 30, and a heat sink plate 32. The light source 26 is embodied by, for example, a light emitting diode (LED). The light source 26 is secured to the front surface of the supporting plate 30 such that the light emitting surface faces forward in the direction of light axis Ax. The light source 26 is provided such that its center is located below the back focal point F of the projection lens 22. Further, the light source 26 is divided into a plurality of individual light sources 26a-26e subject to individual illumination control by a headlamp apparatus controller 40 described later. The individual light sources 26a-26e each have a substantially rectangular shape and are arranged horizontally in a series. The individual light sources 26a-26e are configured such that the individual light sources 26b and 26d are larger in the horizontal direction than the individual light source 26c, and the individual light sources 26a and 26e are larger in the horizontal direction than the individual light sources 26b and 26d. The individual light source 26c is provided on the light axis Ax, adjoined laterally by the individual light sources 26b and 26d, which are then adjoined laterally by the individual light sources 26a and 26e, respectively.

The heat sink plate 32 is a member for dissipating heat generated by the light source 26 and is held on the surface of the supporting plate 30 toward the rear end of the vehicle. The light source unit 24 is secured to the holder 28 via the supporting plate 30. Each of the individual light sources 26a-26e may comprise a plurality of light emitting devices arranged in a matrix.

Figure 3:
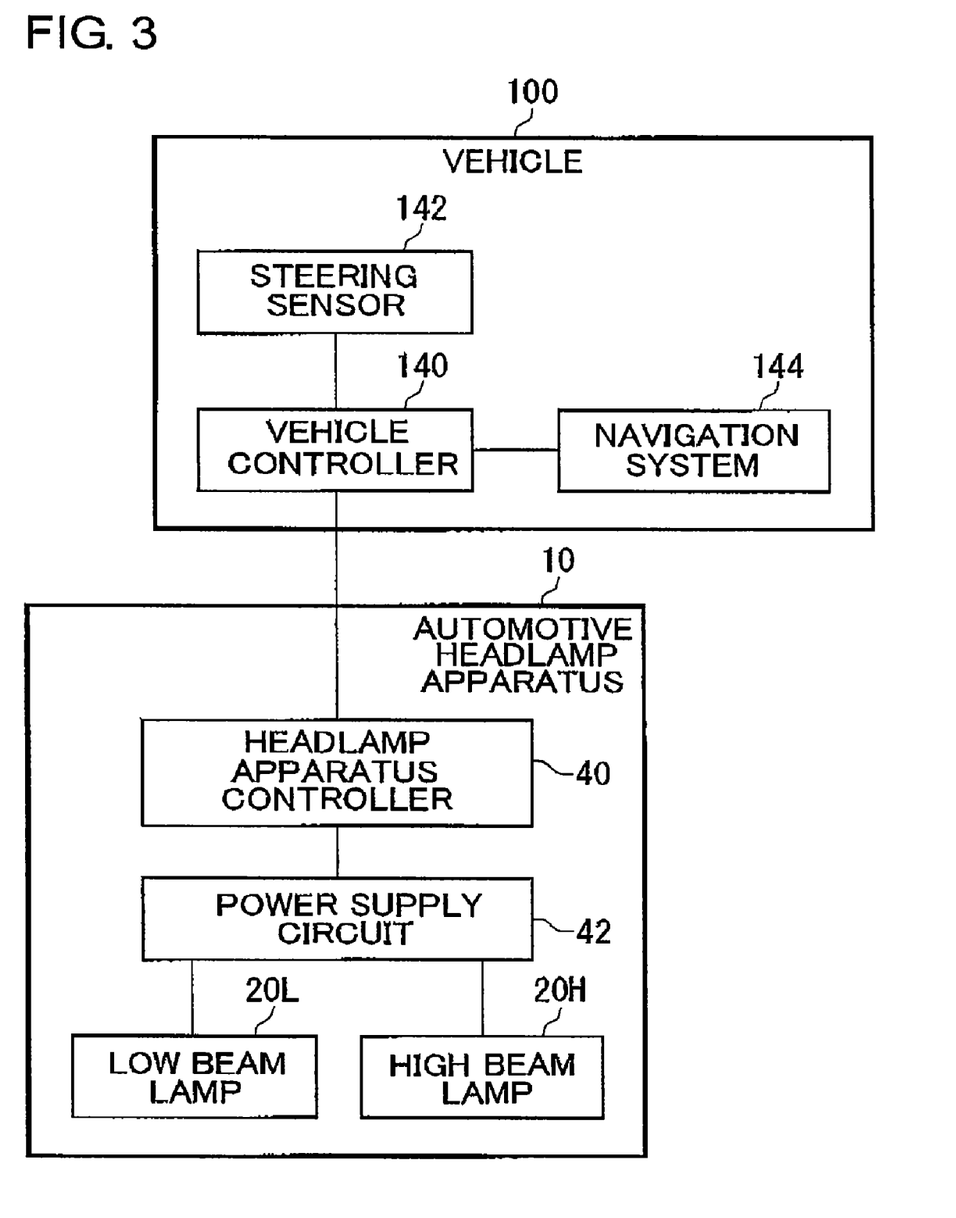
FIG. 3 is control block diagram of the automotive headlamp apparatus according to the first embodiment.

FIG. 3 is control block diagram of the automotive headlamp apparatus 10 according to the first embodiment.

The headlamp apparatus 10 comprises a headlamp apparatus controller 40 as a controller for controlling illumination by the lamps, and a power supply circuit 42 for supplying power for lighting the lamp to the lamps by referring to a control signal from the headlamp apparatus controller 40. A vehicle 100 comprises a vehicle controller 140 for controlling the vehicle 100, a steering sensor 142 for detecting the steering wheel angle, and a navigation system 144 providing traffic information.

Upon receiving an instruction from the driver requesting a low beam or a high beam, the vehicle controller 140 outputs a control signal to the headlamp apparatus controller 40. The headlamp apparatus controller 40 controls the power supply circuit 42 so as to control the lamps to be turned on and off, by referring to the control signal from the vehicle controller 140. In a low beam mode, the vehicle controller 140 detects the driving conditions of the vehicle 100 by referring to a signal from the steering sensor 142 or the navigation system 144 and outputs a control signal to the headlamp apparatus controller 40. The headlamp apparatus 40 performs illumination control of the high beam lamp 20H adapted to the driving conditions of the vehicle 100, by referring to the control signal from the vehicle controller 140. More specifically, when the vehicle controller 140 detects a predefined driving condition of the vehicle 100, the headlamp apparatus controller 40 changes the magnitude of power output from the power supply circuit 42 so as to control illumination from the individual light sources 26a-26e individually and supplement the low beam distribution pattern accordingly. In this process, the headlamp apparatus controller 40 may additionally provide high beam illumination on the condition that the provision for light distribution defined for a low beam is complied with. The provision for light distribution defined for a low beam is, for example, a provision for light distribution defined in JIS or ECE.

Figure 4:
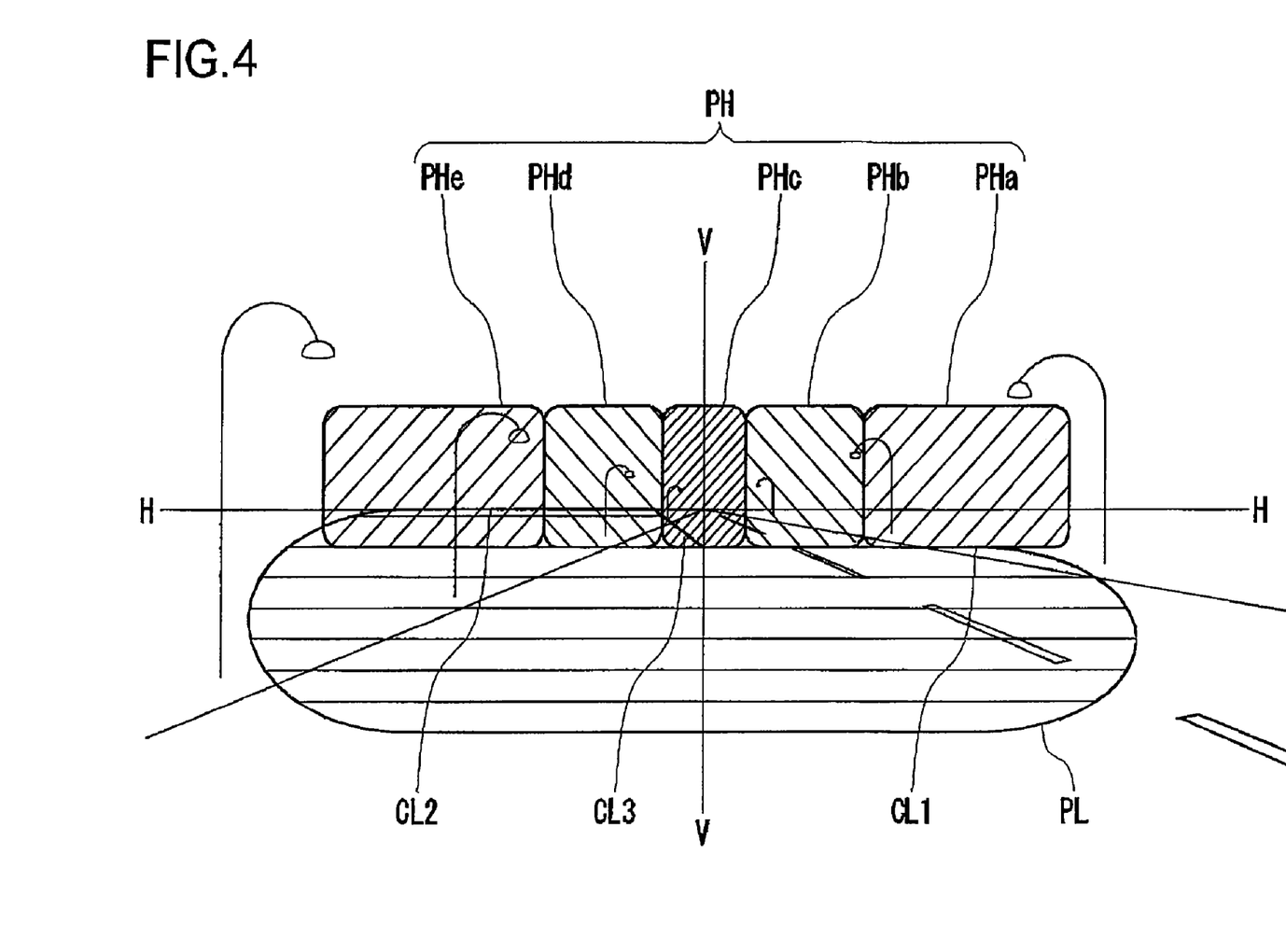
FIG. 4 shows a low beam distribution pattern and a high beam distribution pattern formed on a hypothetical vertical screen set up at a predefined position in front of the lamps.

FIG. 4 shows a low beam distribution pattern and a high beam distribution pattern formed at a predefined position in front of the lamps (e.g., on a hypothetical vertical screen set up, for example, 25 m in front of the lamps).

The automotive headlamp apparatus 10 forms a high beam distribution pattern PH as shown in FIG. 4 using the beam from the high beam lamp 20H. The high beam distribution pattern PH is formed in addition to the low beam distribution pattern PL formed by the beam from the low beam lamp 20L. The high beam distribution pattern PH is divided into individual regions PHa-PHe having substantially rectangular shapes and arranged horizontally in a series, the regions PHa-PHe being formed by the individual light sources 26a-26e, respectively. By adjusting the intensity of illumination from selected ones of the individual regions PHa-PHe and by selectively supplementing the low beam distribution pattern PL, a special light distribution pattern capable of improving the visibility of a road ahead of the vehicle 100 is created.

The low beam distribution pattern PL shown in FIG. 4 is a low beam distribution pattern for a left light distribution and is provided with cut-off lines CL1, CL2, and CL3 at the upper edge thereof such that a step difference is formed between the right side and the left side of the pattern. The cut-off line CL1 is formed to the right of the vertical line V-V passing through a vanishing point in front of the automotive headlamp apparatus 10 so as to extend horizontally as an opposite lane cut-off line. The cut-off line CL2 is formed to extend horizontally as a driver's lane cut-off line to the left of the V-V line and above the cut-off line CL1. The cut-off line CL3 is formed as a diagonal cut-off line connecting the end of the cut-off line CL2 in contact with the V-V line and the end of the cut-off line CL1 in contact with the V-V line. The cut-off line CL3 extends upward to the left at the inclination of 45° from the intersection of the cut-off line CL1 and the V-V line.

When the driver requests a high beam, the low beam lamp 20L and the high beam lamp 20H are turned on, producing high beam illumination using the high beam distribution pattern PH and the low beam distribution pattern PL. When the driver requests a low beam while the vehicle 100 is in a normal driving condition (e.g., when the vehicle is running straight), the low beam lamp 20L is turned on, producing low beam illumination using the low beam distribution pattern PL. Meanwhile, when the vehicle 100 is detected as being in a predefined driving condition, selected ones of the individual light sources 26a-26e of the high beam lamp 20H are turned on to produce illumination with low intensity, in accordance with the driving conditions of the vehicle 100. A special light distribution pattern is formed using selected individual regions PHa-PHe of the high beam distribution pattern PH and the low beam distribution pattern PL in combination.

Figure 5:
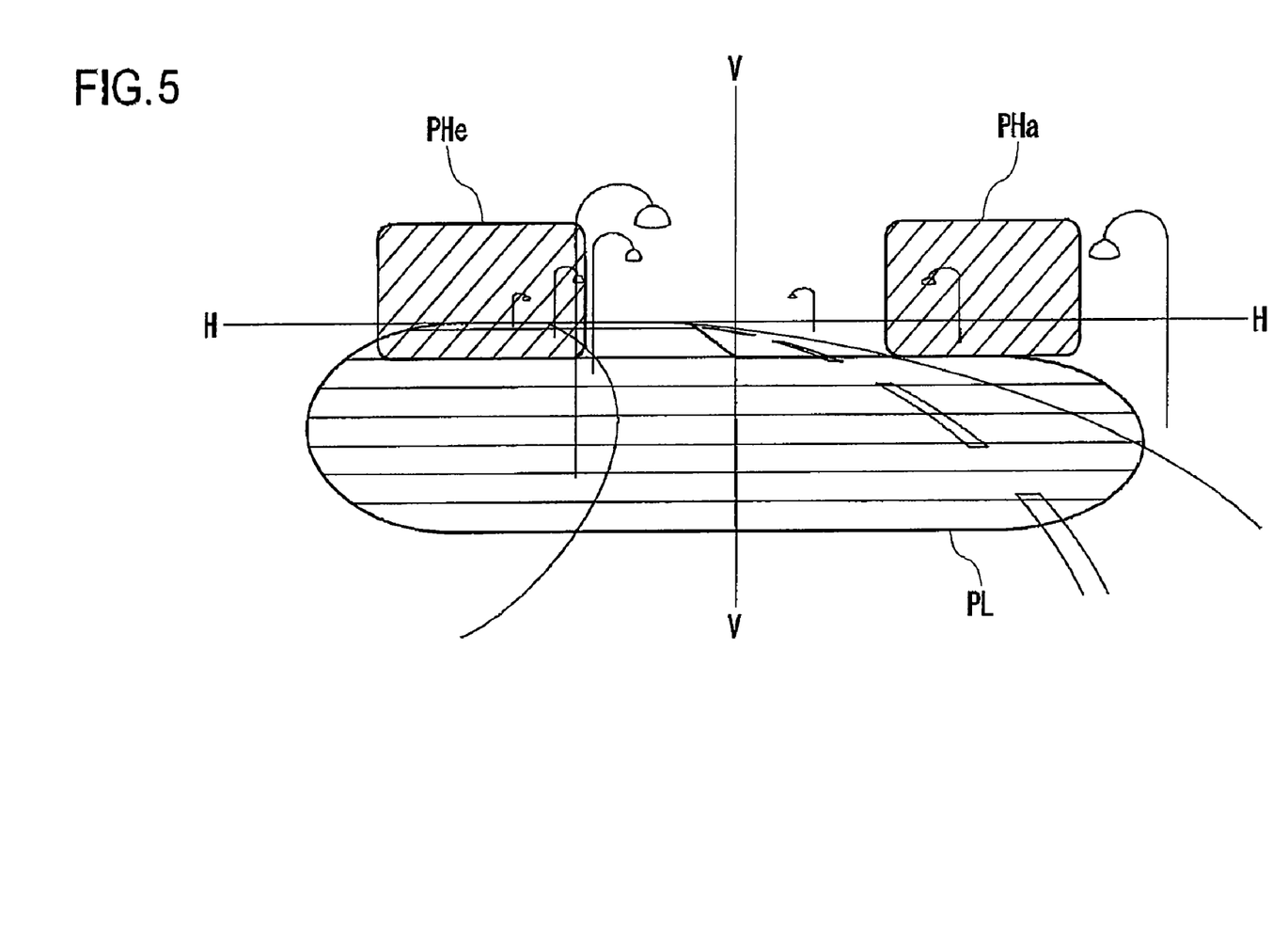
FIG. 5 shows how a special light distribution pattern is formed when a vehicle goes round a bend.

A description will now be given of a how a special light distribution pattern is formed by describing a case where the vehicle 100 rounds a bend using a low beam. FIG. 5 shows how a special light distribution pattern is formed when a vehicle goes round a bend.

First, the information on the steering wheel angle detected by the steering sensor 142 is output to the vehicle controller 140. Alternatively, information on the road traveled by the vehicle 100 is output from the navigation system 144 to the vehicle controller 140. The vehicle controller 140 detects that visibility of the road ahead of the vehicle 100 is low by referring to the signal from the steering sensor 142 or the navigation system 144. Visibility of the road ahead is low when, for example, the vehicle is rounding a bend. When the vehicle controller 140 detects that the vehicle 100 is rounding a bend, the controller 140 outputs a control signal directing the headlamp apparatus controller 40 to form a special light distribution pattern suitably used when a vehicle rounds a bend.

Upon receipt of the control signal from the vehicle controller 140, the headlamp apparatus controller 40 performs control whereby the individual light sources 26a and 26e of the high beam lamp 20H are turned on to produce illumination with intensity lower than normally produced. The headlamp apparatus controller 40 also controls the individual light sources 26b-26d to remain turned off. Thus, the headlamp apparatus controller 40 controls the individual light sources 26a and 26e of the high beam lamp 20H to additionally illuminate areas above the left and right extensions of the low beam distribution pattern PL. In this way, the road ahead in the bend, which is not included in the normal range of illumination formed only by the low beam distribution pattern PL in the low beam mode, is more brightly illuminated. Not both of the individual light sources 26a and 26e may be turned on. Instead, the individual light source 26e may be turned on when the vehicle is rounding a left bend (e.g., when the vehicle is turning left), and the individual light source 26a may be turned on when the vehicle is rounding a right bend (e.g., when the vehicle is turning right).

As described, the automotive headlamp apparatus 10 is configured such that the high beam distribution pattern PH is divided into a plurality of regions. Illumination from the individual regions PHa-PHe as divided is controlled so as to supplement the low beam distribution pattern PL. This makes it possible to more brightly illuminate areas on the road ahead in which requirement for confirming safety is high, with the result that driver visibility is improved. This also makes it possible for the driver to discover an obstacle (e.g., a person, object, creature, parked vehicle, etc.) instantaneously and to take safety measures to avoid the obstacle. As a result, the safety of driving the vehicle 100 is improved.

Second Embodiment

The automotive headlamp apparatus according to the second embodiment differs from the apparatus of the first embodiment in that there is provided a light axis adjustment unit adapted to adjust the light axis Ax of the high beam lamp 20H. A description of the second embodiment will be given. The structure of the automotive headlamp apparatus 10, the structure of the light source unit 24, the low beam distribution pattern, and the high beam distribution pattern are the same as the corresponding structures and patterns of the first embodiment, so that the description thereof is omitted. Like numerals represent like components in the first and second embodiments and the description thereof is omitted.

Figure 6:
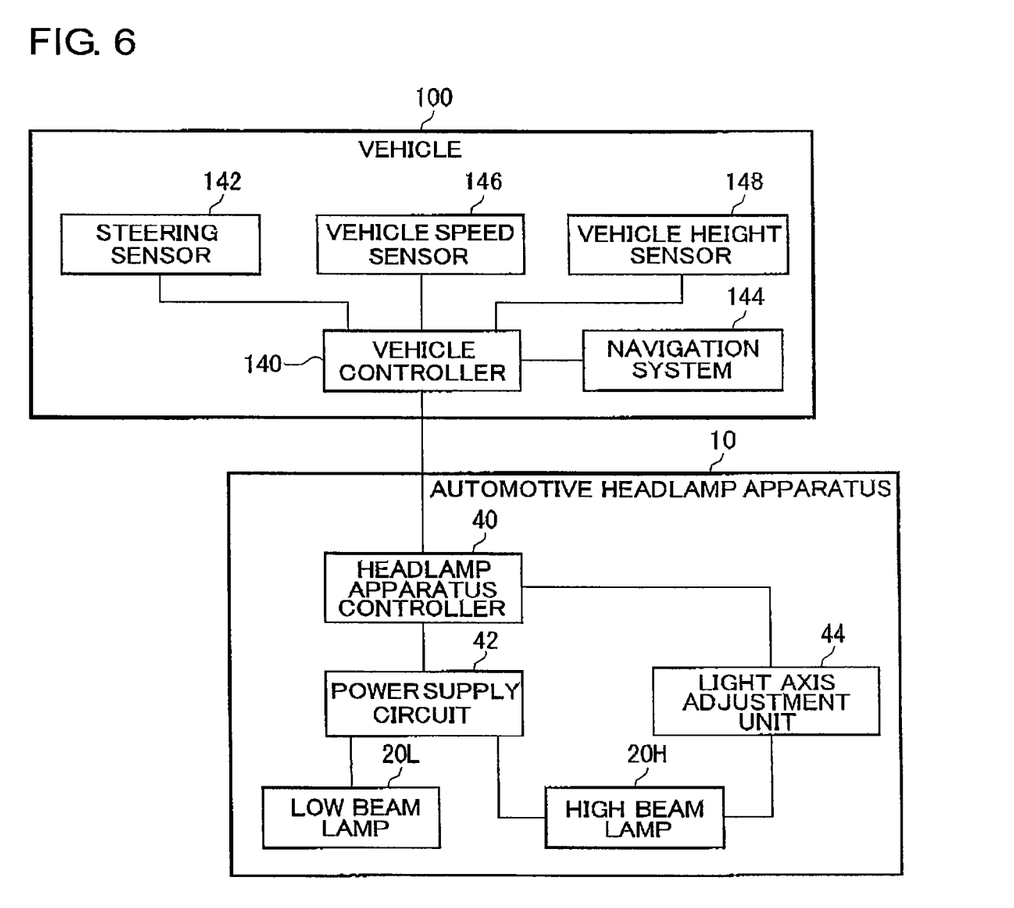
FIG. 6 is a control diagram showing the automotive headlamp apparatus according to the second embodiment.

FIG. 6 is a control diagram showing the automotive headlamp apparatus 10 according to the second embodiment.

In addition to the headlamp apparatus controller 40 and the power supply circuit 42, the automotive headlamp apparatus 10 comprises a light axis adjustment unit 44 adapted to adjust the light axis of the high beam lamp 20H by referring to a control signal from the headlamp apparatus controller 40. In addition to the vehicle controller 140, steering sensor 142, and navigation system 144, the vehicle 100 is provided with a vehicle speed sensor 146 adapted to detect the speed of the vehicle 100 and a vehicle height sensor 148 adapted to detect the height of the vehicle 100.

In a low beam mode, the vehicle controller 140 detects the driving conditions of the vehicle 100 by referring to a signal from the steering sensor 142, the navigation system 144, the vehicle speed sensor 146, or the vehicle height sensor 148 and outputs a control signal to the headlamp apparatus controller 40. Meanwhile, when the vehicle 100 is detected as being in a predefined driving condition, the headlamp apparatus controller 40 turns on selected ones of the individual light sources 26a-26e of the high beam lamp 20H to produce illumination with a low illumination intensity and adjusts the angle of the light axis Ax of the high beam lamp 20H, in accordance with the driving conditions of the vehicle 100. A special light distribution pattern is formed using selected individual regions PHa-PHe of the high beam distribution pattern PH and the low beam distribution pattern PL in combination.

Figure 7:
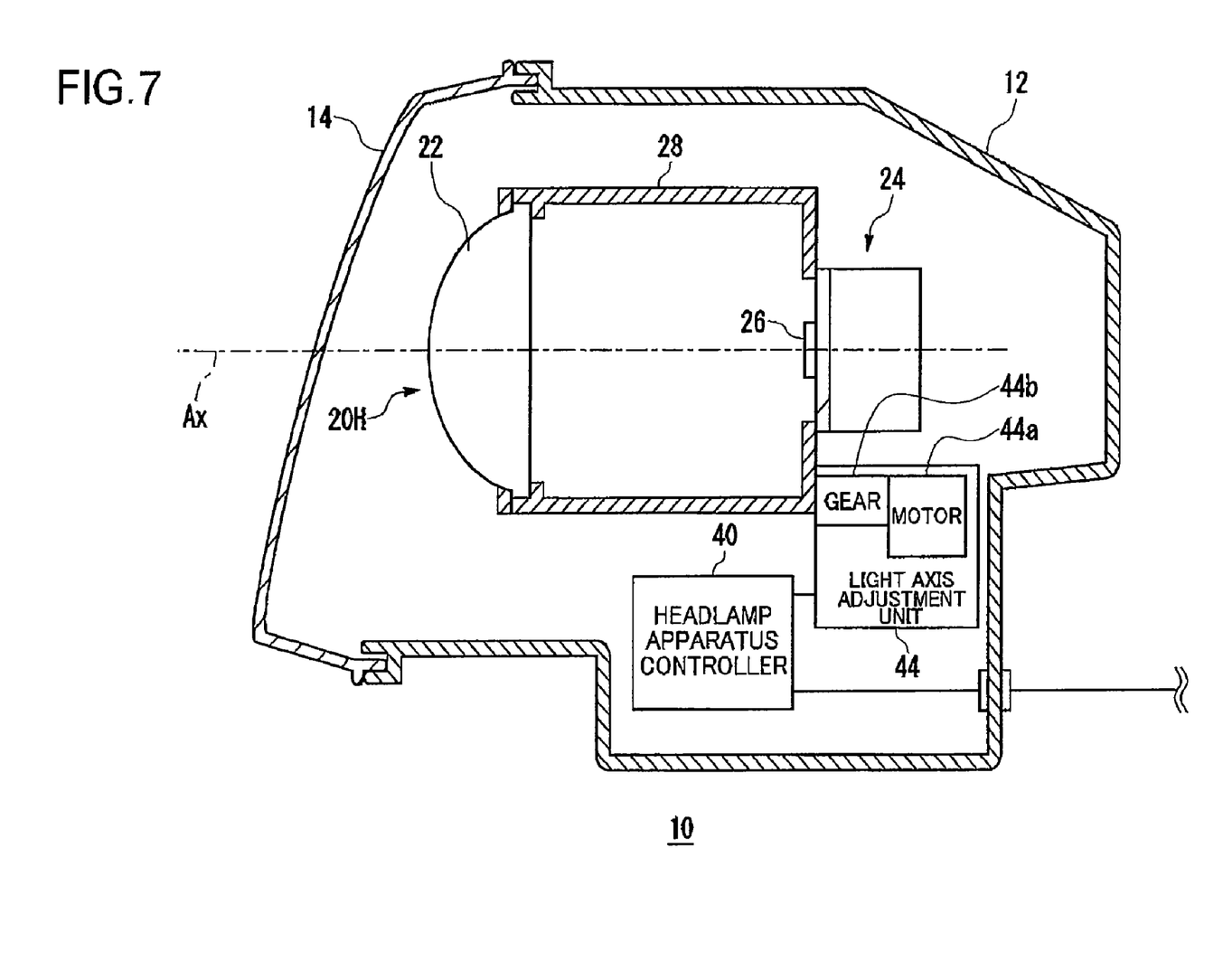
FIG. 7 is a schematic sectional side view of the automotive headlamp apparatus.

FIG. 7 is a schematic sectional side view of the automotive headlamp apparatus 10.

The high beam lamp 20H is held in the lamp body 12 via a supporting member (not shown) so as to be able to swing upward, downward, rightward, and leftward. The light axis adjustment unit 44 comprises a motor 44a, and a gear 44b adapted to transfer the driving force of the motor 44a to the high beam lamp 20H.

Upon receipt of a control signal from the vehicle controller 140 in a low beam mode, the headlamp apparatus controller 40 outputs a control signal directing the light axis adjustment unit 44 to adjust the angle of the light axis Ax of the high beam lamp 20H in adaptation to the driving conditions of the vehicle 100. The light axis adjustment unit 44 drives the motor 44a by referring to the control signal from the headlamp apparatus controller 40 so as to transfer the driving force of the motor 44a to the high beam lamp 20H via the gear 44b. As a result, the angle of light axis Ax of the high beam lamp 20H in the vertical and horizontal directions is adjusted. In this embodiment, it is assumed that the entirety of the high beam lamp 20H is caused to swing so as to adjust the light axis Ax. Alternatively, the light axis of at least one of the individual light sources 26a-26e may be adjusted.

Figure 8A:
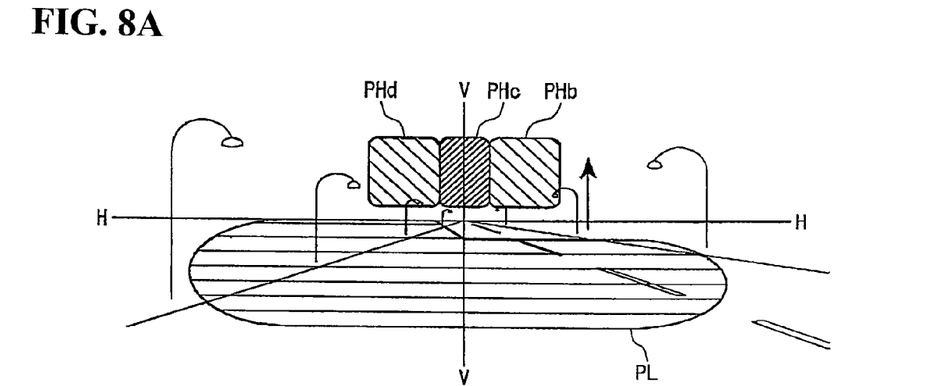
FIGS. 8A-8C show how a special light distribution pattern is formed.
Figure 8B:
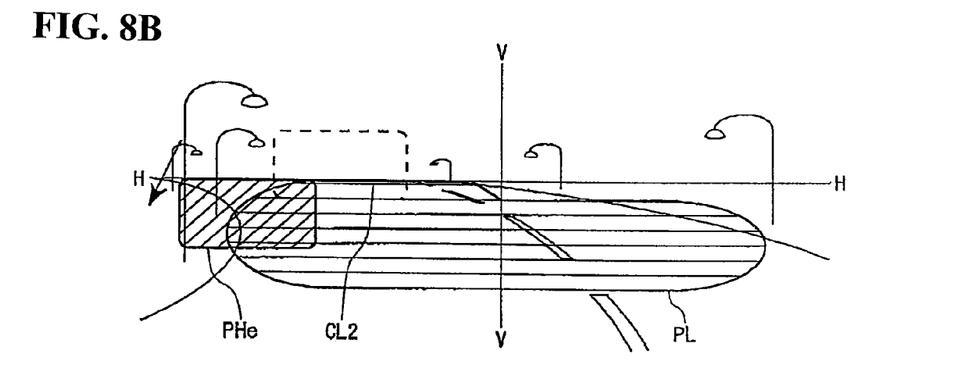
Figure 8C:
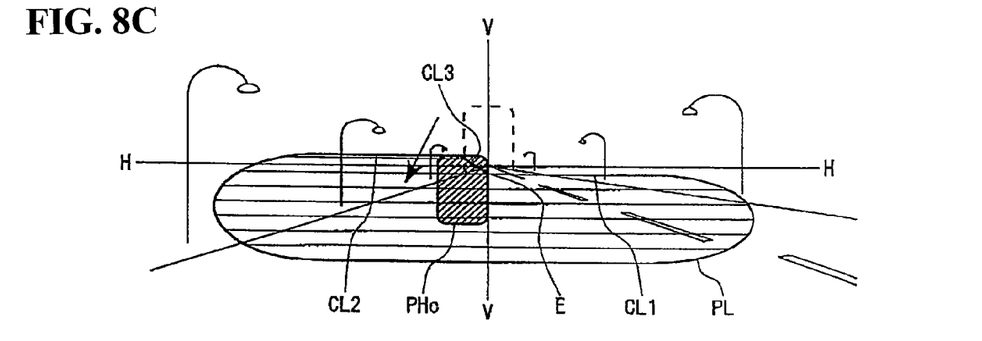

FIGS. 8A-8C show how a special light distribution pattern is formed according to the second embodiment.

FIG. 8A shows a special light distribution pattern whereby an overhead sign region is additionally illuminated. Upon an instruction from the driver requesting a low beam, the headlamp apparatus controller 40 forms a special light distribution pattern whereby a region where traffic signs are expected to be located is additionally illuminated. The region where traffic signs are expected to be located is, for example, an overhead sign region. The case of additionally illuminating an overhead sign region will be explained by way of example.

Specifically, the headlamp apparatus controller 40 turns on the individual light sources 26b-26d to produce illumination with intensity lower than normally produced. In addition, the controller 40 rotates the light axis Ax of the high beam lamp 20H upward by a predefined angle. The headlamp apparatus controller 40 also controls the individual light sources 26a and 26e to remain turned off. The rotation of the light axis Ax is defined such that the lower end line of the individual regions PHb-PHd does not overlap the low beam distribution pattern PL and that the individual regions PHb-PHd include an overhead sign region located above the road ahead. More specifically, the axis is rotated by 2°-3°.

In this way, the headlamp apparatus controller 40 uses the individual light sources 26b-26d of the high beam lamp 20H to additionally illuminate an overhead sign region. This improves the visibility of the overhead sign region for the driver. In one variation, the rotation of the light axis Ax may be adjusted in accordance with the vehicle height of the vehicle 100 obtained via the vehicle height sensor 148. According to this approach, the individual regions PHb-PHd can be more properly located so that the overhead sign region is additionally illuminated in a more accurate manner.

FIG. 8B shows a special light distribution pattern produced when the vehicle is rounding a left bend. When it is found that the visibility of the road ahead of the vehicle 100 is low by referring to a signal from the steering sensor 142 or the navigation system 144, the headlamp apparatus controller 40 forms a special light distribution pattern whereby the visibility of the road ahead is improved. The low visibility of the road ahead occurs when, for example, the vehicle is rounding a bend. The case of rounding a left bend will be described by way of example.

More specifically, the headlamp apparatus controller 40 turns on the individual light source 26e to produce illumination with intensity lower than normally produced and rotates the light axis Ax of the high beam lamp 20H by a predetermined angle downward to the left in the direction of travel. The headlamp apparatus controller 40 also controls the individual light sources 26a-26d to remain turned off. The rotation of the light axis Ax is defined such that at least a portion of the individual region PHe is to the left of the left end of the low beam distribution pattern PL and the upper end line of the region PHe is lower than the cut-off line CL2. Alternatively, the light axis Ax of the high beam lamp 20H is rotated by angle ensuring that the individual region PHe is included in the range of illumination of the bending lamp. More specifically, the light axis Ax is rotated leftward within the range 10°-30° and downward within the range 10°-20°.

In this way, the headlamp apparatus controller 40 uses the individual light source 26e of the high beam lamp 20H to additionally illuminate the left extension of the low beam distribution pattern PL. In this way, the road ahead in the left bend, which is not included in the range of illumination formed only by the low beam distribution pattern PL, is more brightly illuminated. In this process, the rotation of the light axis Ax may be adjusted in accordance with the radius of curvature of the bend obtained from the information on the steering wheel angle from the steering sensor 142 or the road information from the navigation system 144, and with the vehicle height of the vehicle 100 obtained from the vehicle height sensor 148. According to this approach, the individual region PHe can be more properly located so that the road ahead in the left bend is additionally illuminated in a more accurate manner. When the vehicle 100 is rounding a right bend, the same advantage as described above is obtained by performing the same control as described above using the individual light source 26a.

FIG. 8C shows a special light distribution pattern produced in a motorway mode. When it is found that the vehicle 100 is in an improved distant visibility mode by referring to the signal from the vehicle speed sensor 146, the headlamp apparatus controller 40 forms a special light distribution pattern whereby an area to the left of and near the intersection of the H-H line and the V-V line is additionally illuminated. The term "improved distant visibility mode" refers to, for example, a condition in which the vehicle 100 is driven on a road exclusively for vehicles, i.e., is in a motorway mode. Specifically, the term refers to a condition in which the vehicle 100 is moving at a high speed (e.g., 100 km per hour or faster).

More specifically, the headlamp apparatus controller 40 turns on the individual light source 26c to produce illumination with intensity lower than normally produced and rotates the light axis Ax of the high beam lamp 20H by a predetermined angle downward to the left in the direction of travel. The headlamp apparatus controller 40 also controls the individual light sources 26a, 26b, 26d, and 26e to remain turned off. The rotation of the light axis Ax is defined such that individual region PHc overlaps the vicinity of an elbow point E at the intersection of the cut-off line CL1 and the V-V line. More specifically, the light axis Ax is rotated leftward within the range 0°-4° and downward within the range 1°-4°.

In this way, the headlamp apparatus controller 40 forms a highly illuminated hot zone near the elbow point E of the low beam distribution pattern PL. This intensifies the light in an area to the left of and near the intersection between the H-H line and the V-V line, thereby improving the distant visibility for the driver driving on a road exclusively used for vehicles. In this mode, the rotation of the light axis Ax may be adjusted in accordance with the vehicle height of the vehicle 100 obtained via the vehicle height sensor 148. According to this approach, the individual regions PHc can be more properly located so that the hot zone is formed at a more proper position.

As described, the automotive headlamp apparatus 10 according to the second embodiment supplements the low beam distribution pattern PL by changing the angle of light axis Ax of the high beam lamp 20H in accordance with the driving conditions of the vehicle 100. The advantage provided in addition to the advantage of the first embodiment is as follows. Provision for rotation of the light axis improves the freedom in controlling the position of supplementary illumination, making it possible to illuminate a location more suitable for the driving conditions of the vehicle 100. Thus, the visibility of the road is improved for the driver. The second embodiment also allows supplementary illumination within the low beam illumination area adapted to a variety of driving conditions of the vehicle 100 and so further improves the safety of driving the vehicle 100.

The embodiments described are intended to be illustrative only and it will be obvious to those skilled in the art that various modifications such as design variations could be developed based upon the knowledge of a skilled person and that such modifications are also within the scope of the present invention.

Figure 9A:
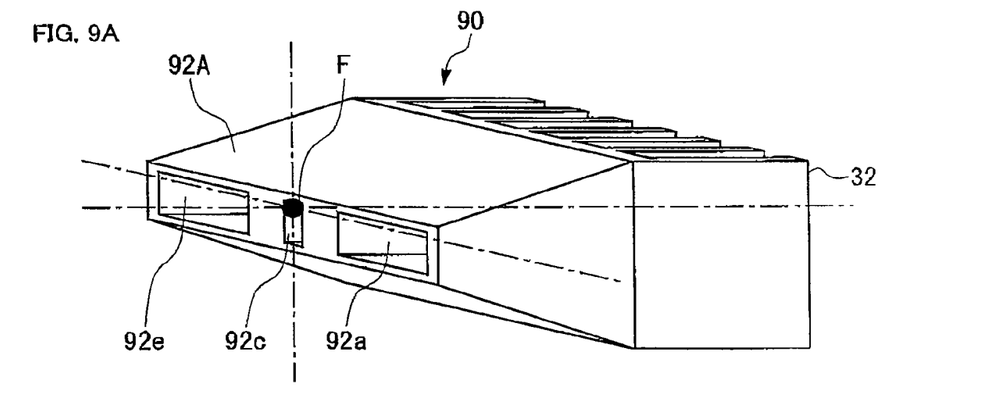
FIGS. 9A and 9B are schematic perspective views of a light source unit of reflector type.
Figure 9B:
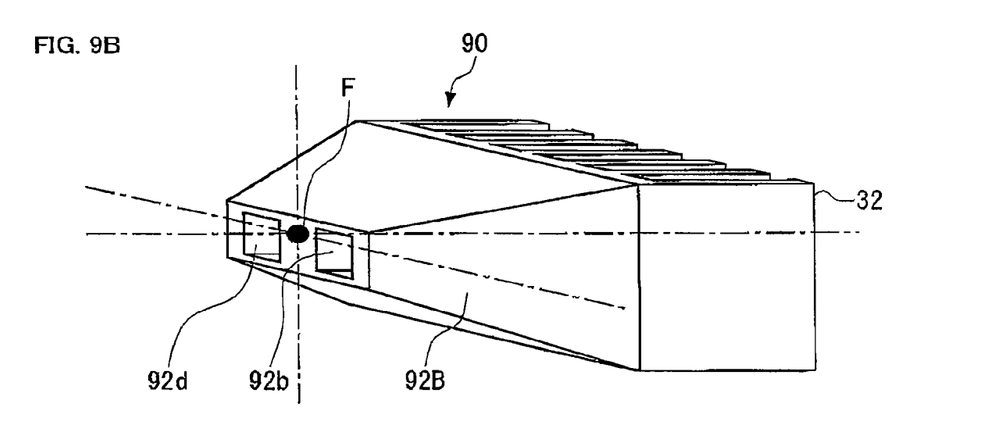

The light source unit 24 of the high beam lamp 20H in the embodiments is of direct emission type whereby the projection lens 22 is directly irradiated by light from the light source 26. Alternatively, the light source unit 24 may be of reflector type. FIGS. 9A and 9B are schematic perspective view of a light source unit of reflector type.

Like the light source unit 24 of direct emission type shown in FIG. 2, a light source unit 90 of reflector type comprises a light source 26, a supporting plate 30, and a heat sink plate 32. The light source unit 90 is further provided with a reflector casing member 92 at the front surface of the supporting plate 30 so as to cover the light source 26. Front end beam outlets 92a, 92c, and 92e are arranged horizontally and discretely on the front end surface of a reflector casing 92A of the light source unit 90 shown in FIG. 9A. Front end beam outlets 92b and 92d are arranged horizontally and discretely on the front end surface of a reflector casing 92B of the light source unit 90 shown in FIG. 9B. Each of the reflector casing members 92A and 92B is partitioned into isolated paths. The interior of each of the paths and the surfaces of the partitions are mirror-finished. The individual regions PHa-PHe are formed inverted projected images of the front end beam outlets 92a-92e.

The light source 26 of the embodiments is described as being divided into a plurality of individual light sources 26a-26e corresponding to the plurality of individual regions PHa-PHe, respectively. Alternatively, the light source 26 may be a single light source subject to unified illumination control. In this case, the individual regions PHa-PHe are formed by controlling the light source to produce illumination with a low illumination intensity and by interposing a shade having a predefined pattern between the light source and the projection lens 22.

What is claimed is:

1. An automotive headlamp apparatus comprising:
a light source for producing a high beam; and
a controller for controlling the illumination from the light source, wherein
the controller divides a light distribution pattern formed by illumination from the light source into a plurality of regions and controls illumination from each of the individual regions as divided so as to supplement a light distribution pattern of a low beam.

2. The automotive headlamp apparatus according to claim 1, wherein the controller is configured to control the illumination so as to illuminate areas above left and right extensions of the light distribution pattern of a low beam.

3. The automotive headlamp apparatus according to claim 1, wherein the individual regions are arranged horizontally in a series.

4. The automotive headlamp apparatus according to claim 2, wherein the individual regions are arranged horizontally in a series.

5. The automotive headlamp apparatus according to claim 1, wherein the light source comprises a plurality of individual light sources forming the individual regions respectively, the apparatus further comprising:
a driving unit operative to rotate a light axis of at least one of the plurality of individual light sources in response to an instruction from the controller, wherein the controller uses the driving unit to change the angle of the light axis so as to supplement the light distribution pattern of a low beam.

6. The automotive headlamp apparatus according to claim 2, wherein the light source comprises a plurality of individual light sources forming the individual regions respectively, the apparatus further comprising:
a driving unit operative to rotate a light axis of at least one of the plurality of individual light sources in response to an instruction from the controller, wherein the controller uses the driving unit to change the angle of the light axis so as to supplement the light distribution pattern of a low beam.

7. A method of controlling an automotive headlamp apparatus, comprising:
controlling illumination from a light source for producing a high beam even while an instruction provided to a headlamp apparatus of a vehicle requests a low beam and does not request a high beam, so as to supplement a light distribution pattern of a low beam.

8. The automotive headlamp apparatus according to claim 1, wherein the light source is a light emitting device.

9. The automotive headlamp apparatus according to claim 1, wherein the controller is configured to control the illumination so as to supplement the light distribution pattern of a low beam when the visibility on the road ahead is low.

10. The automotive headlamp apparatus according to claim 9, wherein the controller is configured to detect that the visibility of the road ahead is low by referring to information obtained from at least one of a steering sensor and a navigation system.

11. The automotive headlamp apparatus according to claim 1, wherein the controller is configured to control the illumination so as to illuminate areas above left and right extensions of the light distribution pattern of a low beam while a vehicle is rounding a bend.

12. The automotive headlamp apparatus according to claim 5, wherein the controller additionally illuminates an overhead sign region.

13. The automotive headlamp apparatus according to claim 5, wherein the controller is configured to control the illumination so as to provide additional illumination outside the end of the light distribution pattern for a low beam in the direction of turn of the road, while a vehicle is rounding a bend.

14. The automotive headlamp apparatus according to claim 5, wherein the controller is configured to control the illumination so as to additionally illuminate an area in the vicinity of an elbow point when a vehicle is in a motorway mode.

15. The automotive headlamp apparatus according to claim 5, wherein the controller adjusts the rotation of the light axis by referring to information obtained from at least one of a vehicle height sensor, a steering sensor, and a navigation system.

* * * * *